(12) United States Patent
Adamski

(10) Patent No.: US 11,815,890 B2
(45) Date of Patent: Nov. 14, 2023

(54) VEHICLE CONTROL WITH FUNCTIONAL REDUNDANCY

(71) Applicant: RAYTHEON TECHNOLOGIES CORPORATION, Farmington, CT (US)

(72) Inventor: Paul A. Adamski, Westfield, MA (US)

(73) Assignee: RTX CORPORATION, Farmington, CT (US)

( * ) Notice: Subject to any disclaimer, the term of this patent is extended or adjusted under 35 U.S.C. 154(b) by 48 days.

(21) Appl. No.: 17/376,597

(22) Filed: Jul. 15, 2021

(65) Prior Publication Data

US 2021/0341918 A1 Nov. 4, 2021

Related U.S. Application Data

(62) Division of application No. 16/135,399, filed on Sep. 19, 2018, now Pat. No. 11,106,205.

(Continued)

(51) Int. Cl.
*B64D 31/06* (2006.01)
*B64D 31/14* (2006.01)
(Continued)

(52) U.S. Cl.
CPC ........... *G05D 1/0077* (2013.01); *B64D 31/06* (2013.01); *B64D 31/14* (2013.01); *F02C 9/00* (2013.01)

(58) Field of Classification Search
CPC ...... G05D 1/0077; B64D 31/06; B64D 31/14; F02C 9/00
See application file for complete search history.

(56) References Cited

U.S. PATENT DOCUMENTS 6,920,581 B2 * 7/2005 Bigbee ................ G06F 11/0793
717/124
8,301,867 B1 10/2012 Mazuk et al.
(Continued)

FOREIGN PATENT DOCUMENTS

DE 102006052757 5/2008
EP 3076293 10/2016

OTHER PUBLICATIONS

Certification Authorities Software Team, Multi-core Processors, Completed Nov. 2016 (Rev 0), Position Paper CAST-32A, ( Year: 2016).*

(Continued)

*Primary Examiner* — Jess Whittington
*Assistant Examiner* — Terry C Buse
(74) *Attorney, Agent, or Firm* — Carlson, Gaskey & Olds, P.C.

(57) ABSTRACT

A control assembly for an aircraft system according to an example of the present disclosure includes a multi-core processor that has a plurality of cores coupled to a communications module and to an arbitration module. The communications module is operable to communicate information between the plurality of cores and one or more aircraft modules. The plurality of cores include first and second cores operable to concurrently execute a first discrete set of software instructions to generate respective instances of an output. The arbitration module is operable to communicate each and every one of the respective instances to control the one or more aircraft modules. A method of operating an aircraft system is also disclosed.

15 Claims, 4 Drawing Sheets

Related U.S. Application Data

(60) Provisional application No. 62/732,747, filed on Sep. 18, 2018.

(51) Int. Cl.
    *F02C 9/00*     (2006.01)
    *G05D 1/00*     (2006.01)

(56) References Cited

U.S. PATENT DOCUMENTS

| | | |
|---|---|---|
| 8,417,990 B2 | 4/2013 | Ohkawa |
| 9,891,978 B1 | 2/2018 | Fejfar et al. |
| 2011/0202488 A1* | 8/2011 | Yuan .................. G05B 17/02 706/12 |
| 2013/0098040 A1* | 4/2013 | Zhang .................. F02C 3/305 60/734 |
| 2017/0089577 A1* | 3/2017 | DeSilva .................. F23Q 23/10 |
| 2017/0277153 A1* | 9/2017 | Samii .................. G05B 19/0425 |
| 2017/0322571 A1* | 11/2017 | Crowley .............. G05B 13/048 |
| 2018/0165246 A1 | 6/2018 | Han |

OTHER PUBLICATIONS

Firesmith, D. (2017). Multicore processing. Carnegie Mellon University SEI blog. Retrieved Aug. 14, 2018 from: https://insights.sei.cmu.edu/sei_blog/2017/08/multicore-processing.html.

Partial European Search Report for European Patent Application No. 19198131.5 completed Feb. 14, 2020.

European Search Report for European Patent Application No. 19198131.5 completed Feb. 14, 2020.

* cited by examiner

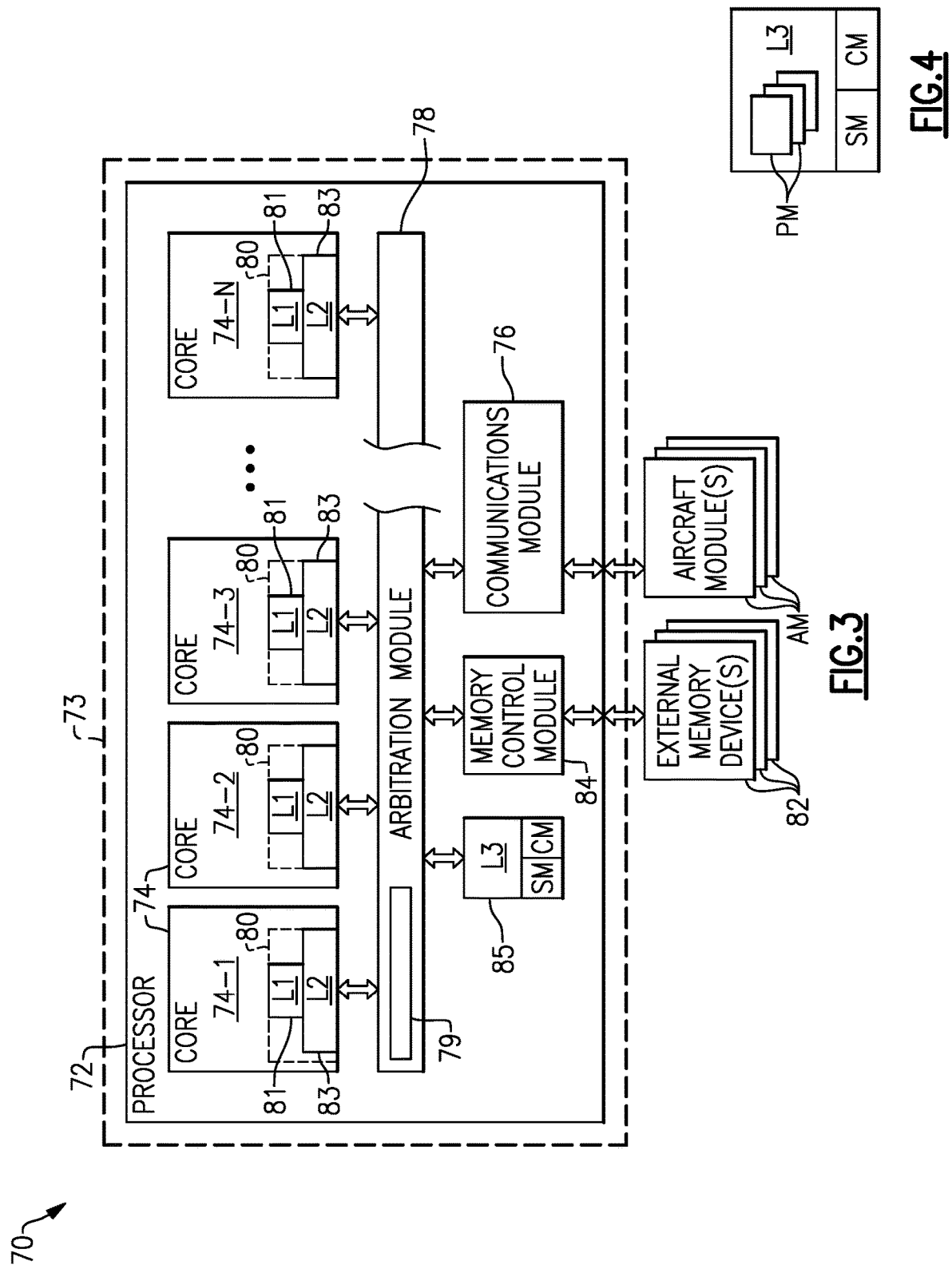

VEHICLE CONTROL WITH FUNCTIONAL REDUNDANCY

CROSS REFERENCE TO RELATED APPLICATION

This application is a divisional of U.S. patent application Ser. No. 16/135,399, filed on Sep. 19, 2018, which claims priority to U.S. Provisional Application No. 62/732,747, filed Sep. 18, 2018.

BACKGROUND

This disclosure relates to control of vehicle systems, and particularly a vehicle control incorporating a multi-core processing architecture.

Vehicles such as an aircraft may include one or more mission and safety critical functions that may be implemented by redundant hardware and/or software systems. Example systems can include a gas turbine engine that provides propulsion for the aircraft.

A gas turbine engine typically includes a fan section, a compressor section, a combustor section, and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The engine may be coupled to redundant controllers to command the engine during operation.

SUMMARY

A control assembly for an aircraft system according to an example of the present disclosure includes a multi-core processor that has a plurality of cores coupled to a communications module and to an arbitration module. The communications module is operable to communicate information between the plurality of cores and one or more aircraft modules. The plurality of cores include first and second cores operable to concurrently execute a first discrete set of software instructions to generate respective instances of an output. The arbitration module is operable to communicate each and every one of the respective instances to control the one or more aircraft modules.

In a further embodiment of any of the foregoing embodiments, the plurality of cores include third and fourth cores operable to concurrently execute a second discrete set of software instructions to control the one or more aircraft modules.

In a further embodiment of any of the foregoing embodiments, the third core, but not the fourth core, is operable to concurrently execute the first discrete set of software instructions with the first and second cores to control the one or more aircraft modules.

In a further embodiment of any of the foregoing embodiments, each of the plurality of cores includes a localized memory, and the localized memory includes L1 cache and L2 cache.

In a further embodiment of any of the foregoing embodiments, the processor includes L3 memory accessible by each of the plurality of cores through the arbitration module.

In a further embodiment of any of the foregoing embodiments, the L3 memory includes random access memory (RAM).

In a further embodiment of any of the foregoing embodiments, an external memory is coupled to the processor, and the processor includes a memory control module that interconnects the plurality of cores and the external memory.

In a further embodiment of any of the foregoing embodiments, the memory control module interconnects the arbitration module and the external memory.

In a further embodiment of any of the foregoing embodiments, the first discrete set of software instructions include a predictive model relating to one or more gas turbine engine components.

In a further embodiment of any of the foregoing embodiments, the arbitration module is operable to compare the respective instances to sensor information communicated from the one or more aircraft modules, and is operable to communicate a selected output to control the one or more gas turbine engine components. The selected output corresponds to at least two matched values from the respective instances and the sensor information.

In a further embodiment of any of the foregoing embodiments, the control assembly is a portion of a full authority digital engine control (FADEC).

A gas turbine engine assembly according to an example of the present disclosure includes a gas turbine engine that has a fan section that has a fan, a compressor section that has a compressor, a combustor section that has a combustor, and a turbine section that has a turbine driving the compressor. An engine control is coupled to the gas turbine engine and includes a multi-core processor that has a plurality of cores coupled to a communications module and to an arbitration module. The communications module is operable to communicate information between the plurality of cores and the gas turbine engine. The plurality of cores include first and second cores operable to concurrently execute a first discrete set of software instructions to generate respective instances of an output. The arbitration module is operable to communicate the respective instance from the first core in response to at least one predetermined criterion being met to control the gas turbine engine, but is operable to communicate the respective instance from the second core in response to the at least one predetermined criterion not being met to control the gas turbine engine.

In a further embodiment of any of the foregoing embodiments, the first and second cores operable to generate the respective instances based on sensor information communicated from the gas turbine engine.

In a further embodiment of any of the foregoing embodiments, the first discrete set of software instructions include a predictive model relating to one or more components of the gas turbine engine, and the first and second cores generate the respective instances based on at least one expected condition of the gas turbine engine.

In a further embodiment of any of the foregoing embodiments, the plurality of cores includes a third core that generates an output based on sensor information communicated from the gas turbine engine, and the arbitration model is operable to determine whether the at least one predetermined criterion is met in response to comparing the respective instances to the output from the third core.

A method of operating an aircraft system according to an example of the present disclosure includes communicating information from a plurality of aircraft modules to a multi-core processor, the multi-core processor having first and second cores, concurrently executing a first discrete set of software instructions on the first and second cores to generate respective instances of an output based on the information, and controlling the plurality of aircraft modules according to the respective instance from the first core in response to at least one predetermined criterion being met, but controlling the plurality of aircraft modules according to the respective instance from the second core in response to the at least one predetermined criterion not being met.

In a further embodiment of any of the foregoing embodiments, the plurality of aircraft modules includes a gas turbine engine component, and the information includes sensor information relating to a condition of the gas turbine engine component.

In a further embodiment of any of the foregoing embodiments, the step of concurrently executing the first discrete set of software instructions includes executing a predictive model relating to the plurality of aircraft modules.

In a further embodiment of any of the foregoing embodiments, the respective instances of the output are generated in response to accessing data in a shared memory of the multi-core processor.

In a further embodiment of any of the foregoing embodiments, the multi-core processor includes a third core, and further includes generating an output from the third core based on sensor information communicated from the plurality of aircraft module, determining whether the at least one predetermined criterion is met in response to comparing the respective instances to the output from the third core.

The various features and advantages of this disclosure will become apparent to those skilled in the art from the following detailed description. The drawings that accompany the detailed description can be briefly described as follows.

BRIEF DESCRIPTION OF THE DRAWINGS

FIG. 3 illustrates a multi-core processor.
FIG. 4 illustrates a memory device.

DETAILED DESCRIPTION

Figure 1:
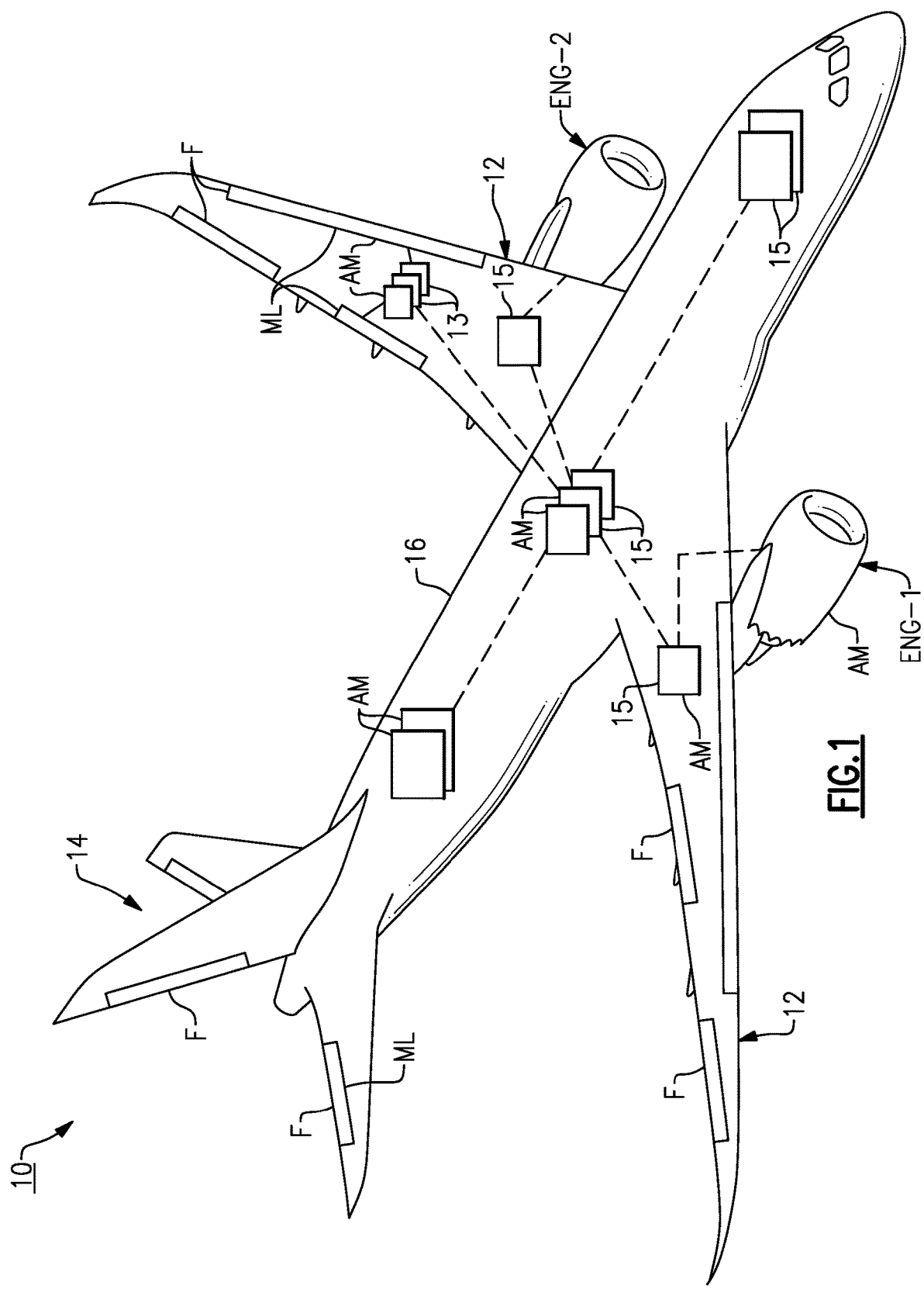
FIG. 1 shows an exemplary aircraft.

FIG. 1 illustrates a vehicle or aircraft 10 according to an example. The aircraft 10 includes a pair of wings 12 and a tail section 14 that extend from a body or fuselage 16. The aircraft 10 includes a plurality of vehicle systems or aircraft modules AM distributed at various discrete locations of the aircraft 10. The aircraft modules AM including hardware and/or software to provide functionality to operate and control the aircraft 10.

Example aircraft modules AM can include actuation systems that control or modulate one or more mechanical loads ML such as pumps and pivotable flaps F coupled to actuators 13. The flaps F can be located along the wings 12 and tail section 14 to augment control of the aircraft 10. Other example aircraft modules AM can include input/output (I/O) modules to interconnect with other systems and modules of the aircraft 10, engine and fuel systems, electrical and auxiliary power systems, environment control systems (ECS), fire protection systems, galley control systems, lighting systems, water and waste systems, landing gear systems, diagnostics systems, and other known systems, for example. Other aircraft modules AM can include control assemblies or systems 15 distributed at various locations of the aircraft 10. Example control systems 15 include avionics systems, cockpit, visualization and display systems, and communications and navigation systems.

In the illustrated example of FIG. 1, the aircraft modules AM include one or more engines to provide propulsion, such as a pair of engines ENG-1, ENG-2 attached to the wings 12.

The engines ENG-1, ENG-2 can be controlled by or otherwise communicate with one or more of the control systems 15.

Each aircraft module AM can share or otherwise communicate data and other information with other aircraft modules AM during operation of the aircraft 10, including other control systems 15. The aircraft modules AM can be configured as redundant pairs or sets of modules and/or can incorporate redundant sets of hardware and/or software components to provide functionality to the aircraft 10 during operation. Although the teachings herein primary refer to an aircraft, other vehicle systems can benefit from the teachings herein, including other aerospace systems such as space vehicles and satellites, ground-based vehicles and power generation systems, and marine systems.

Figure 2:
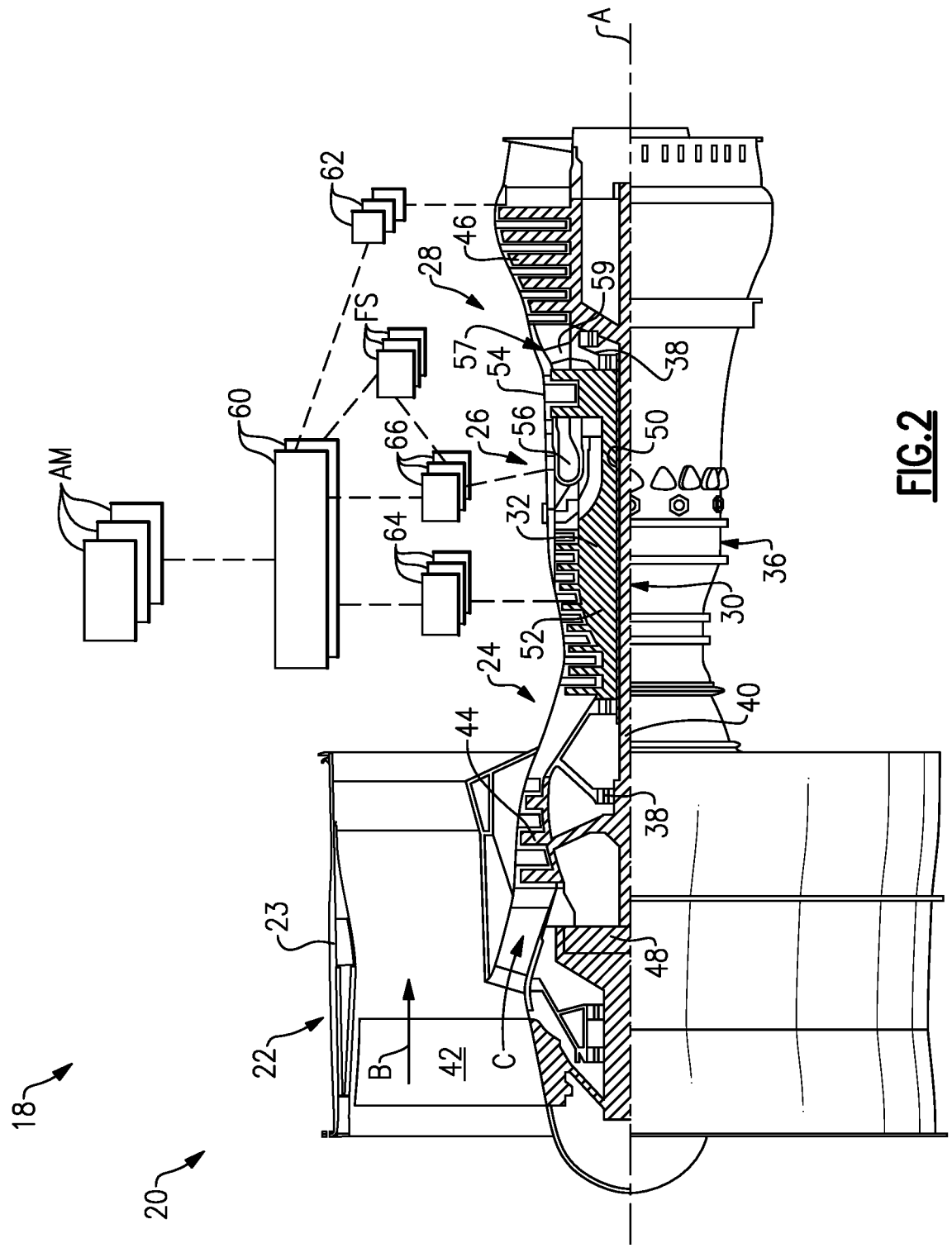
FIG. 2 illustrates a gas turbine engine.

FIG. 2 schematically illustrates a gas turbine engine assembly 18 including a gas turbine engine 20. The engine 20 can be incorporated into aircraft 10 of FIG. 1, for example. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 23, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°\ R)]^{0.5}$. The "Low corrected fan tip speed" as disclosed herein according to one non-limiting embodiment is less than about 1150 ft/second (350.5 meters/second).

The engine assembly 18 includes one or more engine controllers or controls 60 (one shown for illustrative purposes). The engine control 60 is operable to communicate with or is otherwise coupled to the engine 20 and aircraft modules AM, such as sensor(s) 62 that measure one or more conditions of the engine 20 and/or aircraft 10 and actuator(s) 64 to control or move various components of the engine 20. The engine control 60 can be coupled to valve(s) 66 to communicate fluid between the engine 20 and fluid source(s) FS. Fluid sources FS can communicate fluid such as fuel, lubricant and/or cooling airflow.

The control 60 can include a processor, a memory and an interface. The processor may, for example only, be any type of known microprocessor having desired performance characteristics. The memory may, for example only, includes UVPROM, EEPROM, FLASH, random-access memory (RAM), read-only memory (ROM), DVD, CD, a hard drive, or other computer readable medium which may store data for operation of the control assembly as described herein. The interface facilitates communication with the other systems or components of the engine 20 or aircraft 10. The control 60 can be a portion of a full authority digital engine control (FADEC) such as an electronic engine controller (EEC), another subsystem of the engine 20 or aircraft 10, or a stand-alone system, for example, or part of a distributed, on-board processing architecture. In other examples, functionality of control 60 is executed on two different FADECs and/or processors.

Referring to FIG. 3, a control assembly 70 for a vehicle or aircraft system is disclosed. The control assembly 70 includes a multi-core processing architecture and can be incorporated into one of the control systems 15 or other aircraft modules AM of FIGS. 1 and 2, or the engine control 60 of FIG. 2, for example. The control assembly 70 is operable to provide redundancy for one or more features of the aircraft 10 and/or engine 20.

The control assembly 70 includes at least one multi-core processor 72 mounted on a hardware interface 73 such as a motherboard or backplane. As is known, a multi-core processor or central processing unit (CPU) is a single integrated circuit (IC) including two or more independent processing units or "cores". Each core is a separate and distinct hardware component and is operable to simultaneously or concurrently read and execute software instructions stored in memory, which may be referred to as "parallel processing." The cores can have the same hardware construction or at least some of the cores may differ, which may be referred to as a "homogenous multi-core processor" and a "heterogeneous multi-core processor," respectively. The cores can be interconnected via a system bus to share data and other information and to access various system resources internal and external to the IC.

The processor 72 includes a hardware memory or cache. As is known, a hardware cache can include an instruction cache and a data cache. The data cache can be organized as a hierarchy of separate and distinct memory or cache levels, including level 1 (L1) cache, level 2 (L2) cache and level 3 (L3) cache. L1 cache may be referred to as a primary cache and is a memory bank that can be built into the respective CPU. L2 and L3 caches are memory banks that can be built into the CPU or onto a motherboard. L1 and L2 caches are dedicated to the respective cores, whereas L3 cache can be shared or otherwise accessed by two or more of the cores. L1 cache directly interfaces with the respective core. L2 cache directly interfaces with L1 cache. L3 cache directly interfaces with L2 cache.

In the illustrated example of FIG. 3, the processor 72 includes a plurality of cores 74 (indicated as 74-1, 74-2, 73-4 to 74-N) coupled to one or more other hardware components including a communications module 76 and to an arbitration module 78. The communications module 76 is operable to communicate information between the cores 74 and one or more peripheral devices such as aircraft modules AM and other portions of the aircraft 10 and engine 20. In examples, the communications module 76 is operable to communicate information via a Peripheral Component Interconnect Express (PCIe) standard on a communications bus.

In examples, the processor 72 executes a single operating system (OS) including a plurality of software applications that are allocated to the cores 74. In other examples, the processor 72 executes two or more operating systems. Software applications for each OS can be allocated to a single one of the cores 74 such that each core 74 executes a different OS, or can be allocated to two or more of the cores 74.

In examples, first core 74-1 serves as a master or primary core, and the remaining cores 74-2 to 74-N serve as secondary cores. For example, the first core 74-1 may execute one or more administrative functions and interface with other aircraft modules AM external to the engine 20, whereas the secondary cores 74-2 to 74-N may be dedicated to executing functions or applications specific to operation of the engine 20. In other examples, the processor 72 includes two or more master cores.

The processor 72 includes one or more memory locations to store data and other information. Each of the cores 74 includes a localized memory 80. In the illustrated example of FIG. 3, the localized memory 80 includes L1 cache and L2 cache 81, 83. In other examples, the localized memory 80 excludes L2 cache. The processor 72 includes L3 memory 85 accessible by each of the cores 74 through the arbitration module 78. The L3 memory 85 can include static RAM having shared memory (SM) and communications memory (CM), for example.

The processor 72 can be coupled to one or more external memory devices 82. The external memory device 82 can include double data rate synchronous dynamic random-access memory (DDR SDRAM), RAM and/or ROM, for example. The external memory device 82 may store relatively large libraries, data sets and process definitions, for example.

The processor 72 includes a memory control module 84 that interconnects the cores 74 and external memory device(s) 82 via the arbitration module 78. The external memory devices 82 can be configured as shared memory accessible by the cores 74 to read and/or write data or other information to shared memory locations. The memory control module 84 can control access to the shared memory locations utilizing various techniques, including locks and other system level operations provided by the OS.

The processor 72 is operable to execute one or more software applications or functions to control one or more of the aircraft modules AM including engine 20. Each software application can reside at an application level above the respective OS. Discrete sets of software functions or instructions comprising the software applications can be distributed or allocated to each of the cores 74 for execution during operation of the aircraft 10 and/or engine 20. The software functionality can be level loaded or spread across the cores 74 based on loading and bandwidth limitations, for example. Each of the cores 74 can execute various utilities, libraries, function calls, etc., provided by the respective OS, but at least some or each of the individual cores 74 is operable to execute only a subset of the total defined functionality at the application level.

For example, first and second cores 74-1, 74-2 operable to concurrently execute a first discrete set of software functions or instructions to generate respective instances of one or more defined outputs. The first set of instructions are common to the first and second cores 74-1, 74-2, and may not be allocated to or otherwise executed by one or more of the other cores 74. For the purpose of this disclosure, the term "concurrent" means simultaneous or nearly simultaneous execution of software instruction(s) or function(s) during the same scheduling window on each respective core of the CPU, subject to delay in execution relating to access to shared resources or scheduling. The respective instances of the defined output(s) correspond to values concurrently calculated or generated by each of the respective cores 74-1, 74-2 in response to execution of the first set of software instructions. The respective instances may be the same or may differ depending on values of the respective inputs utilized by the cores 74-1, 74-2 in executing the first set of software instructions.

Each discrete set of software instructions may be defined with respect to one or more discrete inputs communicated or otherwise defined by the aircraft systems AM. Example inputs can include measurements or other information from sensors 62 of FIG. 2 relating to a present condition of portions of the engine 20 and/or aircraft 10. Other example inputs can include calculated values and other information generated by other discrete software instructions executed by other cores 74 and information from other control systems 15 of the aircraft 10. Example outputs can include control signals, messages or other information to modulate or otherwise control actuators 64 and valves 66 of FIG. 2.

In some examples, the first discrete set of software instructions include one or more predictive models PM (FIG. 4) relating to one or more gas turbine engine components of the engine 20 or other portions of the aircraft 10. For example, each predictive model PM can include one or more libraries stored in memory (FIG. 4) that generate output(s) based on expected input(s) corresponding to condition(s) or state(s) of the respective engine component (or aircraft module AM). Utilizing the predictive module(s) PM, the first and second cores 74-1, 74-2 are operable to concurrently calculate or generate respective instances of the output(s) based on at least one expected state or condition of the aircraft 10 and/or engine 20. Example expected conditions include speeds, pressures and temperatures for the aircraft 10, engine 20 and/or portions thereof. Each expected condition can be determined or otherwise defined with respect to other actual and/or expected states or conditions.

Other discrete sets of software functions can be allocated to other sets of the cores 74. For example, the cores 74 can include third and fourth cores 74-3, 74-4 operable to concurrently execute a second discrete set of software functions or instructions to generate respective instances of one or more outputs to control the one or more aircraft modules AM. In examples, the third core 74-3, but not the fourth core 74-4, is operable to concurrently execute the first discrete set of software instructions with the first and second cores 74-1, 74-2 to control one or more aircraft modules AM and provide further redundancy.

The arbitration module 78 is operable to communicate each and every one of the respective instances of the output(s) from the discrete sets of software instructions to control the aircraft module(s) AM, including various portions of the engine 20. Said differently, the arbitration module 78 can select and communicate any of the respective instances of the outputs(s) that are concurrently calculated or generated by the respective cores 74 to the aircraft modules AM.

In the illustrated example of FIG. 3, the arbitration module 78 includes a voting module 79 for selecting one or more of the outputs concurrently generated by the respective cores 74 to control the aircraft modules AM. The voting module 79 is operable to compare respective instances of the defined output(s) of the discrete sets of software instructions to sensor information communicated from the aircraft module(s) AM. The sensor information may be generated by the sensors 62 of FIG. 2, for example. The voting module 79 is operable to communicate a selected output to control the aircraft module(s) AM or gas turbine engine component(s) of the engine 20. The selected output(s) can correspond to at least two matched values from the respective instances of values for the concurrently calculated or generated outputs and the sensor information.

For example, values for one or more outputs can be generated by the third and/or fourth cores 74-3, 74-4 based on the sensor information, and values for two or more of the outputs can be generated by the first and second cores 74-1, 74-2 based on the predictive model(s). The voting module 79 is operable to set the selected value or output in response to values for at least two of the outputs matching from the respective cores 74-1, 74-2, 74-3 (and 74-4) to provide redundancy and/or fault isolation and detection. In other examples, the first and second cores 74-1, 74-2 are operable to generate the respective instances or values of the output(s) based on sensor information communicated from the engine 20.

The arbitration module 78 is operable to communicate a value of the respective instance(s) of the output(s) from the first core 74-1 in response to at least one predetermined criterion (or criteria) being met to control the engine 20 or another aircraft module AM, but is operable to communicate a value of the respective instance(s) of the output(s) from another core 74, such as the second core 74-2, in response to the at least one predetermined criterion (or criteria) not being met to control the engine 20 or another aircraft module AM. The arbitration model 78 is operable to determine whether the predetermined criterion is met in response to comparing the respective instances to the output(s) from the cores 74. Example predetermined criteria can include the respective output(s) from the first and second cores 74-1, 74-4 matching each other and/or the respective output(s) from the third and/or fourth cores 74-3, 74-4.

Figure 5:
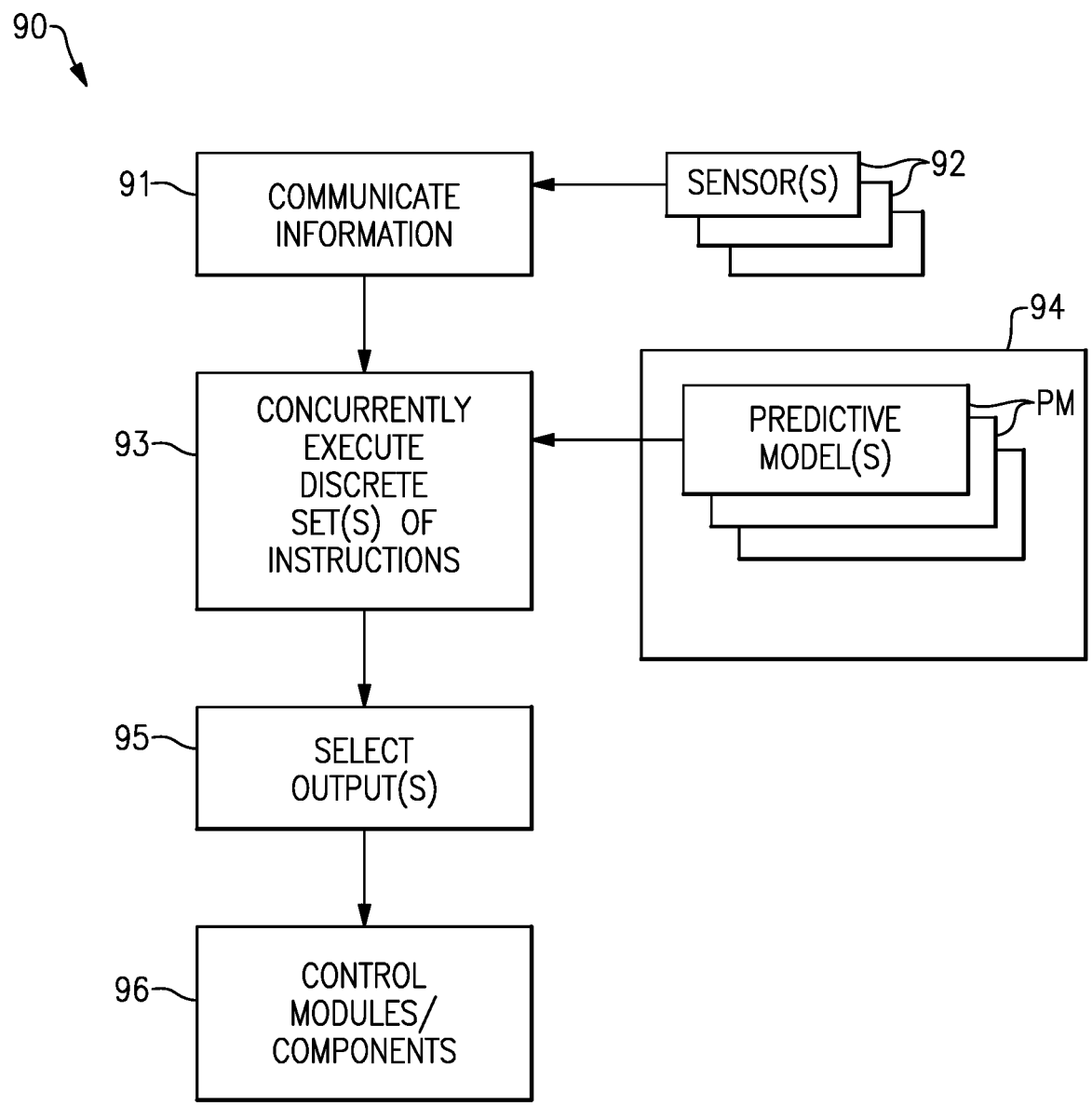
FIG. 5 illustrates a method for operating a vehicle.

FIG. 5 illustrates in a flowchart a method 90 of operating a control system for a vehicle or aircraft system, according to an embodiment. Method 90 can be utilized with aircraft 10 and/or engine 20. Corresponding logic for performing method 90 can be implemented on control assembly 70, for example. Reference is made to FIG. 3 for illustrative purposes.

At block 91, data or other information is communicated from aircraft module(s) AM to processor 72. The information can include sensor information from one or more sensors 92 relating to a condition of one or more gas turbine engine components of the engine 20 or other aircraft modules AM.

At block 93, one or more discrete sets of software instructions are concurrently executed on respective sets of two or more cores 74 to generate respective instances of output(s) based on the information. Values for respective instances of the output(s) can be generated in response to accessing data in a shared memory of the processor 72 at block 94. Block 94 can include accessing one or more predictive model(s) PM relating to the gas turbine engine components or other aircraft modules AM. Block 93 can include loading the predictive model(s) PM into localized memory of the respective core 74, and executing the predictive model(s) PM to generate values for instances of the output(s).

At block 95, values for respective instances of the output(s) generated by the respective cores 74 are selected based on one or more predetermined criteria, including any of the criterion and utilizing any of the techniques disclosed herein.

At block 96, the aircraft module(s) AM such as one or more gas turbine engine components are controlled according to value(s) of the respective instance of the output(s) from one of the cores 74 (e.g., first core 74-1) in response to at least one predetermined criterion being met, but are controlled according to value(s) of the respective instance of the output(s) from another one of the cores 74 (e.g., second core 74-2) in response to the at least one predetermined criterion not being met. The respective instances may correspond to same or different values, such as voltage or current levels that serve as command signals or values in a predefined data structure.

Utilizing the techniques disclosed herein, the redundant cores can execute or otherwise provide relatively tightly synchronized and spatially partitioned functions, including mission and safety critical functions of the vehicle. The localized memory of each core can increase spatial partitioning. Fault detection and accommodation can occur at relatively higher processing rates due to the localization of the cores. Fault isolation and tolerance can be improved due to execution of the functions by redundant cores. The arbitration techniques disclosed herein can improve immunity against random events such as single event effects (SEEs), which may occur due to error in data communicated to one of the cores. Example SEEs can include passive threats such as lightning strikes.

It should be understood that relative positional terms such as "forward," "aft," "upper," "lower," "above," "below," and the like are with reference to the normal operational attitude of the vehicle and should not be considered otherwise limiting.

Although the different examples have the specific components shown in the illustrations, embodiments of this disclosure are not limited to those particular combinations. It is possible to use some of the components or features from one of the examples in combination with features or components from another one of the examples.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A method of operating an aircraft system comprising:
communicating information between one or more peripheral devices of a gas turbine engine and a multi-core processor, the multi-core processor including a plurality of cores, the plurality of cores including first, second, third and fourth cores;
concurrently executing a first discrete set of software instructions on the first and second cores to generate respective instances of an output based on the information, including executing a predictive model relating to one or more components of the gas turbine engine, wherein the respective instances of the output are based on at least one expected input corresponding to at least one expected condition of the one or more components;
communicating sensor information from one or more sensors that measure one or more conditions of the gas turbine engine;
executing software instructions on the third core to generate respective instances of the output based on the sensor information, wherein the at least one expected input differs from the sensor information and differs from an actual condition of the one or more components;

controlling a condition of the one or more components of the gas turbine engine according to the respective instance from the first core in response to at least one predetermined criterion being met, but controlling the condition of the one or more components of the gas turbine engine according to the respective instance from another one of the cores in response to the at least one predetermined criterion not being met;

concurrently executing a second discrete set of software instructions on the third and fourth cores to control the gas turbine engine, the first discrete set of software instructions being separate and distinct from the second set of software instructions, and wherein the fourth core generates the respective instances of the output based on the sensor information;

wherein the step of controlling the gas turbine engine includes communicating a selected output to control the gas turbine engine, the selected output corresponding to at least two matched values from the respective instances of the output and the sensor information;

wherein a first instance of the at least two matched values includes matched values of the respective instances of the output corresponding to the first core and the second core, but not the third core or the fourth core;

wherein a second instance of the at least two matched values includes matched values of the respective instances of the output corresponding to the first core and the third core, but not the second core or the fourth core; and wherein a third instance of the at least two matched values includes matched values of the respective instances of the output corresponding to the third core and the fourth core, but not the first core or the second core.

2. The method as recited in claim 1, wherein the gas turbine engine includes a fan section including a fan, a compressor section including a compressor, a combustor section including a combustor, and a turbine section including a turbine driving the fan.

3. The method as recited in claim 2, wherein the at least one expected condition includes at least one of a speed, a pressure and a temperature of a portion of the gas turbine engine.

4. The method as recited in claim 1, wherein the respective instances of the output are generated in response to accessing data in a shared memory of the multi-core processor.

5. The method as recited in claim 1, further comprising:
determining whether the at least one predetermined criterion is met in response to comparing the respective instances of the output from the first and second cores to the output from the third core.

6. The method as recited in claim 5, wherein the third core, but not the fourth core, concurrently executes the first discrete set of software instructions with the first and second cores to control the gas turbine engine.

7. The method as recited in claim 1, wherein the third core, but not the fourth core, concurrently executes the first discrete set of software instructions with the first and second cores to control the gas turbine engine.

8. The method as recited in claim 1, wherein the at least one expected condition includes at least one of a speed, a pressure and a temperature of a portion of the gas turbine engine.

9. The method as recited in claim 8, further comprising:
causing a valve to communicate fluid between a fluid source and the gas turbine engine in response to the output.

10. The method as recited in claim 1, the third core, but not the fourth core, concurrently executes the first discrete set of software instructions with the first and second cores to control the gas turbine engine.

11. The method as recited in claim 1, wherein each of the plurality of cores includes a localized memory, and the localized memory includes L1 cache and L2 cache.

12. The method as recited in claim 11, wherein the processor includes L3 memory accessible by each of the plurality of cores.

13. The method as recited in claim 12, wherein the L3 memory includes random access memory (RAM).

14. The method as recited in claim 1, wherein the multi-core processor is a portion of a full authority digital engine control (FADEC).

15. The method as recited in claim 1, wherein:
the controlling step includes causing a valve to communicate fluid between a fluid source and the gas turbine engine in response to the output.

* * * * *